US007625107B2

(12) United States Patent
Brod

(10) Patent No.: US 7,625,107 B2
(45) Date of Patent: Dec. 1, 2009

(54) METHOD FOR ACTUATING HEADLIGHTS OF A MOTOR VEHICLE

(75) Inventor: Ralf Brod, New York, NY (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 11/836,838

(22) Filed: Aug. 10, 2007

(65) Prior Publication Data

US 2007/0276551 A1    Nov. 29, 2007

Related U.S. Application Data

(63) Continuation of application No. PCT/EP2006/000155, filed on Jan. 11, 2006.

(30) Foreign Application Priority Data

Feb. 11, 2005    (DE) .................... 10 2005 006 288

(51) Int. Cl.
*B60Q 1/00* (2006.01)
(52) U.S. Cl. .................... 362/464; 362/465; 362/466
(58) Field of Classification Search .......... 362/464–466
See application file for complete search history.

(56) References Cited

U.S. PATENT DOCUMENTS

| 2,890,386 A | 6/1959 | Matkins et. al. |
| 4,236,099 A | 11/1980 | Rosenblum |
| 5,329,204 A | 7/1994 | Ricca |

(Continued)

FOREIGN PATENT DOCUMENTS

DE    196 20 779 C1    5/1997

(Continued)

OTHER PUBLICATIONS

International Search Report dated Jun. 7, 2006 with English translation of relevant portion (Four (4) pages).

(Continued)

*Primary Examiner*—Jacob Y Choi
*Assistant Examiner*—Robert J May
(74) *Attorney, Agent, or Firm*—Crowell & Moring LLP

(57) ABSTRACT

A method is provided for actuating the headlights of a motor vehicle with a manual mode, in which the headlights can be transferred into a first illuminating state by manually actuating a selector lever in a first actuating direction and by actuating the selector lever in a second actuating direction can be transferred into a second illuminating state, and with an automatic mode, in which an external lighting situation is detected by sensors and evaluated by an evaluation device so that, according to the results of the evaluation, the headlights are automatically displaced into the first or into the second illuminating state. In the automatic mode, an override possibility is provided so that, independently of the results of the evaluation, the headlights can be transferred into the respective illuminating state by manually actuating the selector lever in the first or the second actuating direction. An additional override mode is provided, which is switched on by manually actuating the selector lever in the automatic mode, whereby in the event that the headlights are in the first illuminating state, an actuation of the selector lever in the first actuating direction causes a switching between the automatic mode and the override mode.

17 Claims, 2 Drawing Sheets

U.S. PATENT DOCUMENTS

| | | | |
|---|---|---|---|
| 5,760,546 A * | 6/1998 | Pabla et al. | 315/82 |
| 6,069,329 A | 5/2000 | Weiss et al. | |
| 6,711,481 B1 | 3/2004 | King et al. | |
| 6,891,115 B2 | 5/2005 | Rudolph et al. | |
| 6,958,897 B2 | 10/2005 | Kubota et al. | |
| 2002/0065594 A1 | 5/2002 | Squires et al. | |
| 2002/0101166 A1 | 8/2002 | Weindorf et al. | |
| 2003/0123706 A1 | 7/2003 | Stam et al. | |
| 2006/0049029 A1 | 3/2006 | Eggers et al. | |

FOREIGN PATENT DOCUMENTS

| | | |
|---|---|---|
| DE | 198 22 271 A1 | 11/1999 |
| DE | 198 25 026 A1 | 12/1999 |
| DE | 198 56 132 A1 | 6/2000 |
| DE | 199 58 507 A1 | 6/2001 |
| DE | 101 56 653 A1 | 5/2003 |
| DE | 102 49 817 A1 | 5/2004 |
| DE | 298 25 026 U1 | 8/2004 |
| EP | 1 345 475 B1 | 9/2003 |

OTHER PUBLICATIONS

German Search Report dated Jan. 9, 2007 with English translation of relevant portion (Nine (9) pages).

* cited by examiner

METHOD FOR ACTUATING HEADLIGHTS OF A MOTOR VEHICLE

CROSS-REFERENCE TO RELATED APPLICATIONS

This application is a continuation of PCT International Application No. PCT/EP2006/000155, filed on Jan. 11, 2006, which claims priority under 35 U.S.C. §119 to German Application No. 10 2005 006 288.1, filed Feb. 11, 2005, the entire disclosures of which are expressly incorporated by reference herein.

BACKGROUND AND SUMMARY OF THE INVENTION

The invention relates to a method for actuating headlights of a motor vehicle with a manual mode, in which the headlights can be transferred into a first illuminating state by manually actuating a selector lever in a first actuating direction. By actuating the selector lever in a second actuating direction, the headlights can be transferred into a second illuminating state. The vehicle includes an automatic mode, in which an external lighting situation is detected by sensors and evaluated by an evaluation device so that, according to the results of the evaluation, the headlights are automatically displaced into the first or into the second illuminating state. In the automatic mode, an override possibility is provided so that, independently of the results of the evaluation, the headlights can be transferred into the respective illuminating state by manually actuating the selector lever in the first or the second actuating direction.

Such a method is disclosed in German patent document DE 101 56 653 A1. The method for automatically controlling the headlights of a motor vehicle is used, in general, to decrease the negative impact on other road users by reducing the glare effect of one's own headlights, while simultaneously taking the strain off of the driver. Thereby, special sensors detect an external lighting situation, which is analyzed in a control unit or a central data processing unit. There exist a multitude of approaches for detecting the external lighting situation and for the special analysis. For example, German patent document DE 298 25 026 U1 suggests an image-forming, color-sensitive sensor, whose output images are analyzed for brightness, geometric arrangement of the light source, and the color of the light source. The results of the analysis indicate the actual properties of the detected light sources and, in particular, show whether the driver of the oncoming or leading vehicle could be possibly blinded by one's own high beam. If this is the case, an automatic shift is made to the low beam. If, in contrast, the external lighting situation is evaluated to the effect that there is no danger of blinding the other road users, one's own headlights are switched over to high beam in order to optimize the driver's own far sight.

The method disclosed in the aforementioned German patent document DE 101 56 653 A1, takes into consideration the circumstance that the driver of a motor vehicle would not like to subject himself to the automatic control of the headlights in every situation, but rather would like to be able to override the automatic adjustment as a function of the situation. In order to design the override so that it is especially easy for the driver, the same selector lever is actuated in the same way that the driver is accustomed to from the manual mode. This means that, when the high beam is automatically switched on, an actuation of the selector lever in the "low beam" direction leads to a manual switchover to the low beam, whereas, when the low beam is automatically switched on, an actuation of the selector lever in the "high beam" direction leads to a manual switchover to the high beam.

Moreover, it is known from other assistance systems, such as an automatic speed control, that the overriding of the automatic mechanism leads to the switching off of the automatic mode and to the transfer into the customary manual mode. In order to return into the automatic mode, it is necessary to actuate an additional actuating element. This requires additional components, which is associated with higher costs, and demands of the driver that he learns special manipulation steps that can vary widely from one type of vehicle to another.

The present invention provides an improved method for actuating headlights of a motor vehicle such that by suggestive actuation of familiar switching elements, the driver can always reach the optimal lighting state for his motor vehicle that is appropriate for the situation.

According to the invention, a method is provided for actuating the headlights of a motor vehicle with a manual mode, in which the headlights can be transferred into a first illuminating state by manually actuating a selector lever in a first actuating direction and by actuating the selector lever in a second actuating direction can be transferred into a second illuminating state; and with an automatic mode, in which an external lighting situation is detected by sensors and evaluated by an evaluation device so that, according to the results of the evaluation, the headlights are automatically displaced into the first or into the second illuminating state. An override possibility is provided in the automatic mode so that, independently of the results of the evaluation, the headlights can be transferred into the respective illuminating state by manually actuating the selector lever in the first or the second actuating direction. An additional override mode, which is switched on by manually actuating the selector lever in the automatic mode, is provided. In the event that the headlights are in the first illuminating state, an actuation of the selector lever in the first actuating direction causes a switching between the automatic mode and the override mode.

In contrast to the prior art, a manual override of the automatic lighting mechanism does not return the system immediately back into the manual mode. Rather, when the automatic function is overridden, the system is transferred into a special override mode, the properties of which differ from the purely manual mode, even though in the override mode no switching, controlled by automatic measures, is carried out. The present invention also provides that in an illuminating state of the headlights, an actuation of the selector lever in the manner usually used for switching on the already-existing illuminating state causes a switching between the automatic mode and the override mode. This switching can be achieved from both modes, insofar as the headlights are in the first lighting state, which is preferably the high beam state. In more precise terms, this means that, in a preferred embodiment, in the event that the high beam is switched on, a renewed actuation of the selector lever in the "high beam" direction leads to the switching between the automatic and the override mode. Thereby, there is no change in the illuminating state of the headlights.

It is advantageously provided that in the event that the headlights are in the override mode in the first illuminating state, the headlights can be transferred into the second illuminating state by actuating the selector lever in the second actuating direction while retaining the override mode. In this respect, the override mode functions like the manual mode. If, as preferably provided, the first illuminating state corresponds to the high beam, and the second illuminating state corresponds to the low beam, this means that, when the high beam is switched on, an actuation of the selector lever in the "low beam" direction in the override mode leads to a dimming of the lights while simultaneously retaining the override mode. In combination with the prior art override possibility, this means for the driver that in any situation, independently of whether the system is in manual, automatic or override mode, when the high beam is on, the driver can dim the lights by actuating the selector lever in the "low beam" direction. It is not necessary that the driver knows the current mode.

This parallelism with the manual mode exists in an advantageous further development of the invention for the reverse switching direction, but not without limitations. Rather, it is provided that in the event that the highlights in the override mode are in the second illuminating state, an actuation of the selector lever in the first actuating direction causes a switching into the automatic mode, if the automatic mode is ready for use. Expressed in terms of the preferred embodiment as an example, where the first illuminating state corresponds to the high beam, and the second illuminating state corresponds to the low beam, this means that, with the low beam on in override mode, an actuation of the selector lever in the "high beam" direction causes a mode switch to the automatic mode. If then following an analysis of the external lighting situation, it is determined that a switch to the high beam is really appropriate, according to the evaluation rules specified in the automatic mode, a switch is made to the high beam as an automatic process. The switch is not made if the automatic mechanism deems that it is inappropriate to switch to the high beam. However, if, contrary to the analysis of the automatic mechanism, the driver wants to put on the high beams, he can do this by actuating the selector lever again in the high beam direction, a maneuver that leads to a switching from the automatic low beam to the high beam in the override mode. This embodiment is especially advantageous, since experience has taught that a manual switch from low beam to high beam takes place only if there are no other road users in the vicinity who could be endangered by the glare. In this situation, however, it is appropriate not only to put on the high beams, but at the same time to entrust the automatic mechanism again with the control of the headlights.

In this respect it is provided advantageously that in the event that the automatic mode is not ready for use, an actuation of the selector lever in the first actuating direction causes a transfer of the headlights into the first illuminating state while retaining the override mode. With respect to the example described above, this means that in the event that the automatic mechanism is not ready for use, the high beam is switched on directly, as in the manual mode.

Since not every driver appreciates the advantages of an automatic headlight control, it is provided in an advantageous manner that a choice can be made between the manual mode, on the one hand, and the automatic and override mode, on the other hand, by way of a switch. This switch is preferably the main lighting switch, which is typically provided in motor vehicles, and which can be expanded to include another "automatic" position. Therefore, the driver may switch at any time into a purely manual mode and actuate the selector lever in the accustomed manner for controlling the headlights.

Preferably, after switching off the ignition of the motor vehicle, the manual mode is selected automatically. If a vehicle is not taking part in moving traffic, a dynamic adjustment of the headlight control, as provided by the automatic and/or override mode, is not necessary.

As explained above, it is not necessary in an advantageous embodiment of the invention that the driver know explicitly the current mode. Nevertheless, there is a control light that indicates to the driver that the automatic mode is switched on. Especially in the case of drivers who are not familiar with such systems, the automatic switching can otherwise come as a surprise and can therefore be perceived to be unpleasant.

Finally, in the event that the headlights are in the second illuminating state, an actuation of the selector lever in the first actuating direction causes the highlights to brighten for the duration of the actuation. This corresponds to the typical headlight flasher function.

Other objects, advantages and novel features of the present invention will become apparent from the following detailed description of the invention when considered in conjunction with the accompanying drawings.

DETAILED DESCRIPTION OF THE DRAWING

Figure 1:
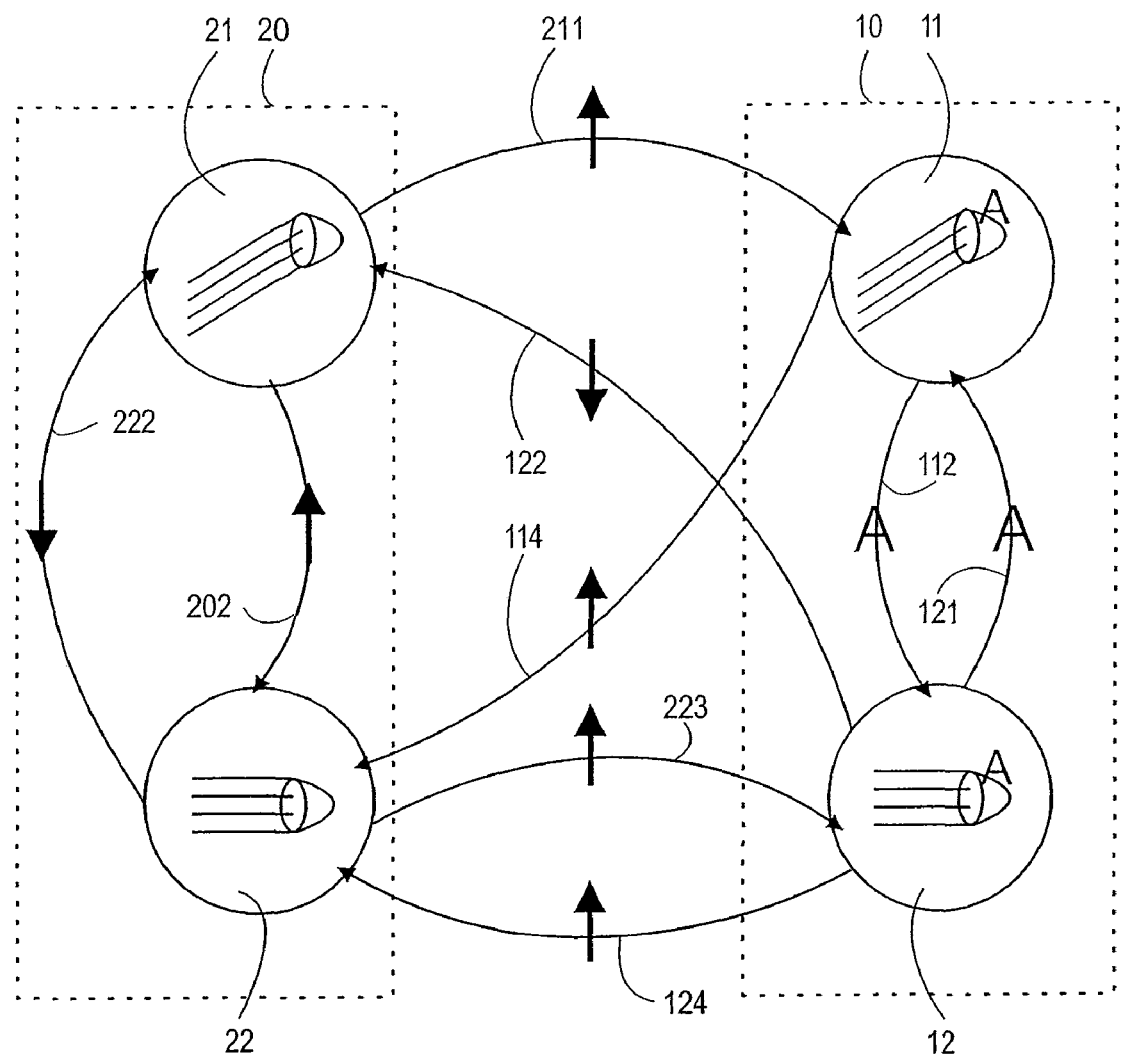
FIG. 1 is a schematic overview of a state diagram of the switching events according to the method of the invention with a high beam state as a first illumination state.

FIG. 1 is a schematic state diagram of the method, according to the invention. The dashed blocks show the automatic mode 10 and the override mode 20, each one of which includes the two illuminating states of the headlights. In the automatic mode 10, a low beam state 11 and a high beam state 12 of the headlights can be set. The graphical representation in FIG. 1 shows these states as pictograms marked with the addition "A". In the override mode 20, a low beam state 21 and a high beam state 22 of the headlights can also be set. They are also presented in FIG. 1 as pictograms, but without the letter "A". The curved arrows in FIG. 1 represent possible transitions between the states 11, 12, 21 and 22. The solid straight arrows on the curved transition arrows symbolize a corresponding actuation of a selector lever. An example of a suitable selector lever is, in particular, a light drop pitman arm, which is usually provided in automobiles for actuating the headlights. In the illustrated embodiment, an upwards pointing actuation arrow means "depress" the drop pitman arm; whereas a downwards pointing actuation arrow denotes "pull" the drop pitman arm. Of course, other embodiments are also contemplated. In such embodiments, the actuating directions are reversed; or other actuating directions are used in said embodiments.

In addition to the modes, i.e., the automatic mode 10 and the override mode 20, depicted in FIG. 1, there is a third, purely manual mode (not illustrated in FIG. 1), which can be set by the driver of the motor vehicle using a separate switch, preferably the main lighting switch. This manual mode, which functions in the known manner, is irrelevant for the present invention. Only the case, in which the system is in automatic/override mode (preferably owing to the choice of the driver and/or other criteria, such as the presence of specific sensor signals), shall be described below.

For the purpose of the explanation, assume initially an automatic high beam state 12. If the sensor detects an external lighting situation, for example, an oncoming or preceding vehicle, so that it will be necessary to dim the lights in order to avoid blinding the other road users, the system automatically switches into the automatic low beam mode 11 (switching arrow 121). If there is no longer any risk of blinding the other road users because, for example, the oncoming car has passed or because the leading car has turned off or was passed, the automatic lighting mechanism switches again into the automatic high beam mode 12 (switching arrow 112).

If the driver perceives the need to dim the lights, that is, a state that was not detected by the automatic mechanism (perhaps because of an oncoming, unlit pedestrian or a wild animal that appears in the light cone of the headlights), then the driver can override the automatic mechanism by pulling the drop pitman arm and transferring the headlights manually into the low beam state 21 (switching arrow 122). At this stage, the system stays in the state 21, independently of the automatic mechanism's evaluation of the external lighting situation.

As long as the aforesaid situation persists, the driver has no reason to change the illuminating state of the headlights. Even if immediately thereafter new situations arise, e.g. owing to the appearance of an oncoming vehicle, that present the risk of blinding a third party, will the driver want to keep the low beam so that he will not have to perform any additional manipulations. Only after the situation has changed so that there are no longer any road users ahead of him who may be blinded by the glare, the driver will want to put the high beams on again. He does this intuitively by depressing the drop pitman arm, as he is accustomed to do. If at this instant the automatic mode is ready for use, a switch is made, according to the switching arrow 211, i.e. a transition into the automatic low beam state 11. Then, the driver transfers the system from the override mode 20 back into the automatic mode 10 without explicitly changing the illuminating state. Of course, the automatic mechanism detects very quickly the present situation, in which there is no risk of blinding a third party, so that immediately thereafter an automatic transfer into the automatic high beam state 12 can be expected (switching arrow 112). Thus, the driver's wish is fulfilled once the high beam has been switched on; while, at the same time, the system was returned into the automatic mode 10.

If, however, after depressing the drop pitman arm, the automatic mechanism's analysis of the external lighting situation does not agree with the driver's evaluation of the situation, that is, contrary to the driver, the automatic mechanism detects the risk of blinding a third party as a given, it stays in the automatic low beam state 11. If, however, the driver wants to assert his wish that the high beam be switched on, he can achieve this by depressing again the drop pitman arm (switching arrow 114). This is equivalent to a manual override of the automatic mechanism and leads to a high beam state 22.

By depressing again the drop pitman arm, the driver can now switch back to the automatic mode 10 (switching arrow 223). If the automatic mechanism deems the high beam state to be appropriate, no change in the illuminating state of the headlights ensues. In this case, the driver can switch back and forth, as desired, between the automatic mode 10 and the override mode 20 by depressing again the drop pitman arm (switching arrow 223, 124). If, however, in the event of a transfer, according to the switching arrow 223, the automatic mechanism deems the low beam state to be appropriate, the lights are automatically dimmed, according to switching arrow 121, following a transfer into the automatic high beam state 12. The system is configured preferably such that it is not necessary for the driver to know the current mode. However, the currently existing mode is indicated advantageously to the driver by way of a suitable indicator light.

If, when switching on the high beam, the system is in override mode, i.e., in state 22, then the automatic mechanism's optionally parallel evaluations of the external lighting situation will not result in a change in the illuminating state of the headlights. If, however, the driver recognizes the necessity to dim the lights, he can do this in the conventional manner by pulling the drop pitman arm (switching arrow 222).

Finally, FIG. 1 also shows another switching arrow 202 with respect to the transition from the low beam state 21 to the high beam state 22 in the override mode. The system concurs with the transfer, if, starting from the low beam state 21, the driver would like to put on the high beams manually, but for some reason the automatic control unit reports that it is not ready for use. In this case, the driver can switch between the states 21 and 22 by actuating the drop pitman arm. In this case, the operating principle of the override mode corresponds to that of the conventional manual mode.

Figure 2:
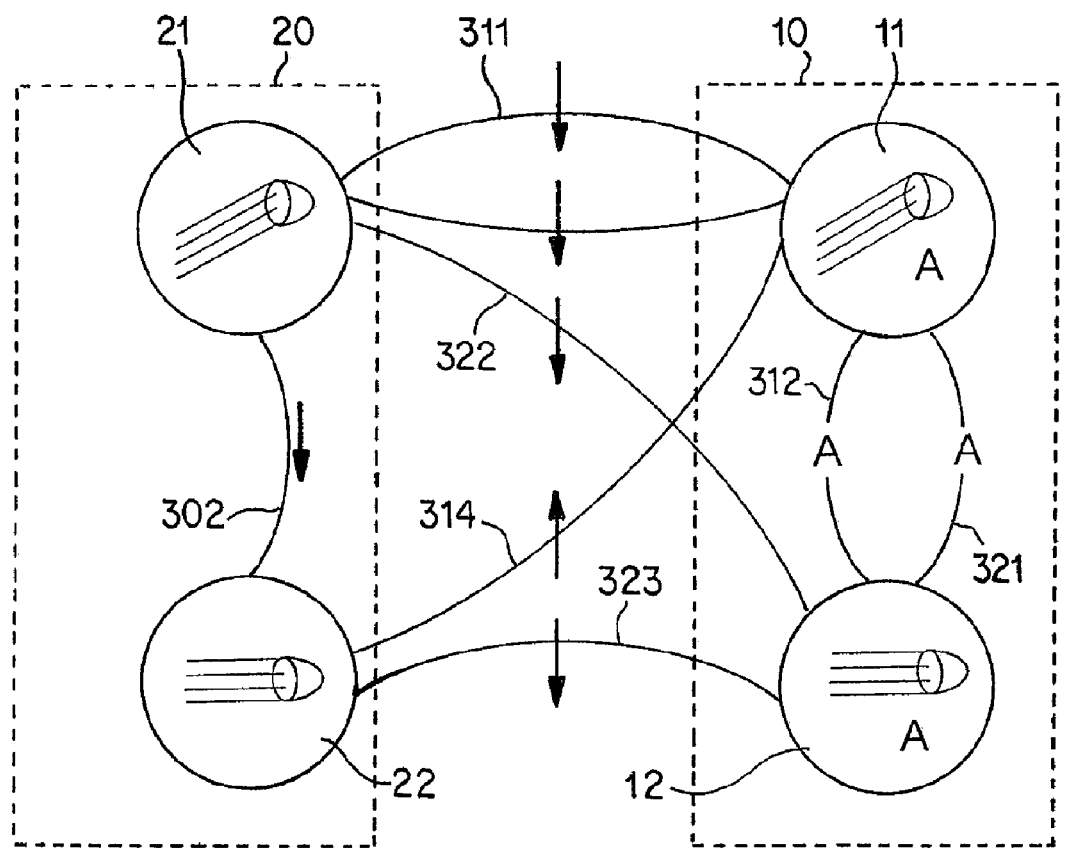
FIG. 2 is a schematic overview of a state diagram of the switching events according to the method of the invention with a low beam state as a first illumination state.

Referring now to FIG. 2, for the purpose of the explanation, assume initially an automatic low beam state 11. If the driver wishes to switch on the high beam lights, that is, a state that was not detected by the automatic mechanism, then the driver can override the automatic mechanism by depressing the drop pitman arm and transferring the headlights manually into the high beam state 22 (switching arrow 314). At this stage, the system stays in the state 22, independently of the automatic mechanism's evaluation of the external lighting situation.

As long as the aforesaid situation persists, the driver has no reason to change the illuminating state of the headlights. Even if immediately thereafter new situations arise, if the driver wants to keep the high beam state he will not have to perform any additional manipulations. If the driver wants to put the low beams on again, he does this intuitively by pulling the drop pitman arm, as he is accustomed to do. If at this instant the automatic mode is ready for use, a switch is made, according to the switching arrow 323, i.e., a transition into the automatic high beam state 12. Thus, the driver transfers the system from the override mode 20 back into the automatic mode 10 without explicitly changing the illuminating state. Of course, the automatic mechanism detects very quickly the present situation, and if there is a risk of blinding a third party, immediately thereafter an automatic transfer into the automatic low beam state 11 can be expected (switching arrow 321). Thus, the driver's wish is fulfilled once the low beam has been switched on; while, at the same time, the system was returned into the automatic mode 10.

If, however, after pulling the drop pitman arm, the automatic mechanism's analysis of the external lighting situation does not agree with the driver's evaluation of the situation, that is, contrary to the driver, the automatic mechanism concludes that high beam illumination is appropriate, it stays in the automatic high beam state 12. If, however, the driver wants to assert his wish that the low beam be switched on, he can achieve this by pulling again the drop pitman arm (switching arrow 322). This is equivalent to a manual override of the automatic mechanism and leads to a low beam state 21.

By pulling again the drop pitman arm, the driver can now switch back to the automatic mode 10 (switching arrow 311). If the automatic mechanism deems the low beam state to be appropriate, no change in the illuminating state of the headlights ensues. In this case, the driver can switch back and forth, as desired, between the automatic mode 10 and the override mode 20 by pulling again the drop pitman arm (switching arrow 311, 324). If, however, in the event of a transfer, according to the switching arrow 311, the automatic mechanism deems the high beam state to be appropriate, the lights are automatically switched to high beam, according to switching arrow 312, following a transfer into the automatic low beam state 11. The system is configured preferably such that it is not necessary for the driver to know the current mode. However, the currently existing mode is indicated advantageously to the driver by way of a suitable indicator light.

If, when switching on the low beam, the system is in override mode, i.e., in state 21, then the automatic mechanism's optionally parallel evaluations of the external lighting situation will not result in a change in the illuminating state of the headlights. If, however, the driver desires to switch on the high beam, he can do this in the conventional manner by depressing the drop pitman arm (switching arrow 302).

Of course, the person skilled in this art knows a multitude of possibilities for implementing the inventive idea. In order to exchange information between the used sensors, control units, state flags, etc., the CAN bus, which is customary in modern motor vehicles, between the control units is especially suitable. In what manner the individual control lines and/or the control bits are run is left to the discretion of the person skilled in the art in view of the specific system requirements. It is also irrelevant for the basic invention whether and which additional factors and criteria have to be fulfilled in order to arrive at the section of the method illustrated in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for actuating headlights of a motor vehicle having a manual mode, in which manual actuation of a selector lever in a first actuating direction transfers the headlights into a first illuminating state, where the first illuminating state is one of a high beam on state and a low beam on state, and manual actuation in a second actuating direction transfers the headlights into a second illuminating state, where the second illuminating state is the other one of the high beam on state and the low beam on state, and an automatic mode, in which the headlights are automatically transferred into the first or the second illuminating state based on an evaluation of an external lighting situation, the method comprising the acts of:

overriding the automatic mode and transferring the headlights into a respective illuminating state by a first manual actuation of the selector lever in the first or the second actuating direction independent of the evaluation of the external lighting situation;

initiating a second manual actuation of the selector lever in the actuating direction opposite the first manual actuation in order to transfer the headlights back into the automatic mode; and initiating a third manual actuation of the selector lever in the automatic mode, wherein if the headlights are in the first illuminating state, an actuation of the selector lever in the first actuating direction causes a switch between the automatic mode and the override mode without changing the illuminating state.

2. The method according to claim 1, wherein if the headlights are in the override mode in the first illuminating state, actuation of the selector lever in the second actuating direction transfers the headlights into the second illuminating state while staying in the override mode.

3. The method according to claim 2, wherein if the headlights are in the override mode in the second illuminating state, actuation of the selector lever in the first actuating direction causes a switch into the automatic mode provided said automatic mode is ready for use.

4. The method according to claim 3, wherein if the automatic mode is not ready for use, actuation of the selector lever in the first actuating direction transfers the headlights into the first illuminating state while staying in the override mode.

5. The method according to claim 1, wherein if the headlights are in the override mode in the second illuminating state, actuation of the selector lever in the first actuating direction causes a switch into the automatic mode provided said automatic mode is ready for use.

6. The method according to claim 5, wherein if the automatic mode is not ready for use, actuation of the selector lever in the first actuating direction transfers the headlights into the first illuminating state while staying in the override mode.

7. The method according to claim 1, wherein the first illuminating state of the headlights is a high beam setting and the second illuminating state is a low beam setting.

8. The method according to claim 7, wherein if the headlights are in the second illuminating state, an actuation of the selector lever in the second actuating direction causes the headlights to brighten for a duration of the actuation.

9. The method according to claim 1, further comprising the act of manually selecting, via a switch, either the manual mode or the automatic mode and the override mode.

10. The method according to claim 9, further comprising indicating to a driver of the motor vehicle when the automatic mode is in use.

11. The method according to claim 9, further comprising the act of automatically selecting the manual mode upon switching-off an ignition of the motor vehicle.

12. The method according to claim 11, wherein if the headlights are in the second illuminating state, an actuation of the selector lever in the second actuating direction causes the headlights to brighten for a duration of the actuation.

13. The method according to claim 9, wherein if the headlights are in the second illuminating state, an actuation of the selector lever in the second actuating direction causes the headlights to brighten for a duration of the actuation.

14. The method according to claim 1, further comprising the act of automatically selecting the manual mode upon switching-off an ignition of the motor vehicle.

15. The method according to claim 14, wherein if the headlights are in the second illuminating state, an actuation of the selector lever in the second actuating direction causes the headlights to brighten for a duration of the actuation.

16. The method according to claim 1, further comprising indicating to a driver of the motor vehicle when the automatic mode is in use.

17. The method according to claim 16, wherein if the headlights are in the second illuminating state, an actuation of the selector lever in the second actuating direction causes the headlights to brighten for a duration of the actuation.

* * * * *